United States Patent [19]

Ortolano

[11] E Patent Number: Re. 32,737

[45] Reissued Date of Patent: Aug. 23, 1988

[54] CONTINUOUS HARMONIC SHROUDING

[75] Inventor: Ralph J. Ortolano, Rancho Palos Verdes, Calif.

[73] Assignee: Southern California Edison, Rosemead, Calif.

[21] Appl. No.: 663,467

[22] Filed: Oct. 18, 1984

Related U.S. Patent Documents

Reissue of:

[64] Patent No.: 4,386,887
Issued: Jun. 7, 1983
Appl. No.: 164,318
Filed: Jun. 30, 1980

[51] Int. Cl.[4] ..... F01D 5/22

[52] U.S. Cl. ..... 416/190; 416/191; 416/196 R

[58] Field of Search ..... 416/500, 196 R, 190–192

[56] References Cited

U.S. PATENT DOCUMENTS

| | | | |
|---|---|---|---|
| 777,432 | 12/1904 | Richter | 416/190 |
| 835,471 | 11/1906 | Rotter | 416/192 |
| 937,006 | 10/1909 | McKee | 416/196 R |
| 980,283 | 1/1911 | Kalberg | 416/196 R X |
| 991,296 | 5/1911 | Haines | 416/500 X |
| 1,378,464 | 5/1921 | Junggren | 416/190 |
| 1,698,327 | 1/1929 | Doran | 416/196 R X |
| 1,858,067 | 5/1932 | Warren | 416/196 R |
| 2,454,115 | 11/1948 | Allen | 416/196 R |
| 2,963,272 | 12/1960 | Welsh | 416/191 |
| 3,180,616 | 4/1965 | Miller | 416/196 R |
| 3,279,571 | 10/1966 | Ortolano | 416/190 |
| 3,306,577 | 2/1967 | Sagara | 416/190 |
| 3,417,964 | 12/1968 | Ortolano | 416/190 |
| 3,584,971 | 6/1971 | Ortolano | 416/191 X |
| 3,588,278 | 6/1971 | Ortolano et al. | 416/195 X |
| 3,606,578 | 9/1971 | Ortolano | 416/191 |
| 3,702,221 | 11/1972 | Ortolano | 416/191 |
| 3,719,432 | 3/1973 | Musick et al. | 416/196 R |
| 3,728,044 | 4/1973 | Fujita et al. | 416/191 X |
| 3,795,462 | 3/1974 | Trumpler | 416/196 |
| 3,986,792 | 10/1976 | Warner | 416/192 |

FOREIGN PATENT DOCUMENTS

| | | | |
|---|---|---|---|
| 29506 | 3/1977 | Japan | 416/195 |
| 54-112406 | 9/1979 | Japan | 416/196 R |
| 272378 | 3/1951 | Switzerland | 416/196 R |
| 843287 | 8/1960 | United Kingdom | 416/196 R |

OTHER PUBLICATIONS

Westinghouse Engineering Report SVE-BP03, Feb. 1972, Saunders et al.

*Primary Examiner*—Everette A. Powell, Jr.
*Attorney, Agent, or Firm*—Sheldon & Mak

[57] ABSTRACT

An improved blade rotor structure for an axial flow turbine substantially reduces vibratory stress at resonant frequencies by rigidly connecting the blades to each other in groups equal in number to [an integer multiple of] the resonant frequency of the blades (i.e. a harmonic frequency) divided by *an integer multiple of* the rotor running speed. Flexible tie means are used for connecting adjacent groups of blades together for substantially reducing axial-torsional vibration of the blades.

37 Claims, 3 Drawing Sheets

CONTINUOUS HARMONIC SHROUDING

Matter enclosed in heavy brackets [ ] appears in the original patent but forms no part of this reissue specification; matter printed in italics indicates the additions made by reissue.

BACKGROUND

This invention relates to an elastic fluid axial flow turbine or compressor and, more particularly, to the blading for such a turbine or compressor.

A variety of blade structures for turbines and compressors are known and a variety of techniques for minimizing vibratory stresses in the blade structure have been developed. For example, attention is directed to U.S. Pat. Nos. [3,279,751]*3,279,571*; 3,588,278; 3,417,964; 3,606,578; and 3,702,221, all of which are incorporated herein by this reference. Techniques for eliminating fatigue failures in turbine blading are also described by Ortolano, et al., "Long Arc Shrouding-Reliability Improvement for Untuned Steam Turbine Blading," ASME Publication 77-JPGC-Pwr-12, September, 1977, which also is incorporated herein by this reference.

An elastic fluid axial flow turbine or compressor comprises a rotor having a peripheral groove and an annular row of blades having root portions disposed in the groove. Small groups of blades have commonly been tied together to reduce vibratory stresses. In this technique, from about 3 to 12 blades are secured to each other by means such as a shroud, lashing wires, or both. However, a disadvantage of this method is that low orders of harmonic excitation are insufficiently attenuated to prevent fatigue failure, particularly when wet and corrosive steam is used.

To minimize this problem, the rotor blades have been connected together in long arc groups of more than 12 blades per group as described in U.S. Pat. No. 3,588,278. In this structure the number of blade groups is equal to [an integer multiple of] the resonant frequency of the blades divided by *an integer multiple of* the rotor running speed. The blades can be connected to each other by a shroud structure or a lashing structure.

Although long arc shrouding has been successful in eliminating failure of untuned blading, failure of tuned blading can still occur because of gaps between the groups of blades. It is necessary to leave gaps because of thermal and centrifugal stresses that develop in use. Because of the gaps, axial-torsional modes of vibration can develop high vibration amplitudes which can lead to failure of blading.

Some solutions to this problem that have been considered include straps covering the gaps, pins bridging the gap between adjacent blades, and welds across the gaps. One such solution is described in U.S. Pat. No. 3,702,221.

These concepts are not totally satisfactory, because they have the disadvantage of not being applicable to existing blading without major modification. With some rotor structures, it is not possible to retrofit existing blading economically. Other problems with these techniques are limited resistance to moisture impingment erosion, an important factor with long low pressure blading.

In view of this, there is a need for a rotor structure that has the advantage of connecting the blades in long arc groups to suppress tangential and axial modes of vibration, and that also suppresses axial-torsional modes of vibration, improves moisture impingement erosion resistance, and can be retrofitted economically to existing rotor structures.

SUMMARY

The present invention is directed to a rotor structure with these features. The rotor structure comprises a rotor spindle, an annular row of radially-extending blades carried by the rotor spindle, and rigid means such as an arcuate shroud ring structure or a lashing structure for rigidly connecting the blades to each other in first long arc groups which comprise more than 12 blades, including an end blade at each end of a group. Each first long arc group is of substantially equal central angular extent. The blades are susceptible to vibration in a tangential inphase mode having a resonant frequency of at least that of the rated maximum running speed of the rotor. The rigid means divides the blade groups into [an integer multiple of] *a number equal to* the blade resonant frequency divided by *an integer multiple of* the rotor running speed. To reduce axial vibration of the blades, tie means flexibly connected the adjacent end blades.

In one version of the invention where the rigid means is a shroud structure, the tie means can be an S-shaped wire clip, where the clip is mounted in a notch in each blade of a pair of end blades adjacent to the shroud structure. Alternatively, the tie means can be a hollow pin or a solid pin having a retaining sleeve for preventing dislodgement of the pin.

Where the rigid means is a lashing structure, sleeves can be used for flexibly connecting the wires of adjacent end blades or flexibly connecting lashing lugs of adjacent end blades. Sleeve movement control when sleeves are used with loose tie wires can be obtained by crimping the sleeves in the center over the wire gaps.

In an alternate version of the invention, both a shroud stucture and lashing wires are used for forming long arc groups of the blades. The lashings connect the blades in second long arc groups of substantially the same central angular extent as the first long arc groups formed by the shroud structure. To minimize the axial-torsional mode vibrations, the gaps between the second long arc groups and the first long arc group are not coincident, i.e. the end blades of the second long arc groups are not directly radially inward from the end blades of the closest first long arc groups and are offset therefrom. Preferably the gaps of the groups formed by the lashing wires are offset by about one-half the central angular extent from the gaps of the first long arc groups for maximum attenuation of the tangential and axial vibrations. The means are used between the end blades of the first long arc groups and/or the second long arc groups.

Advantages of the present invention include substantial reduction in axial-torsional modes of vibration, extended blade life, and ease in retroactive application to existing rotor structures.

DRAWINGS

These and other features, aspects, and advantages of the present invention will become better understood with reference to the following description, appended claims, and accompanying drawings where:

Figure 2:
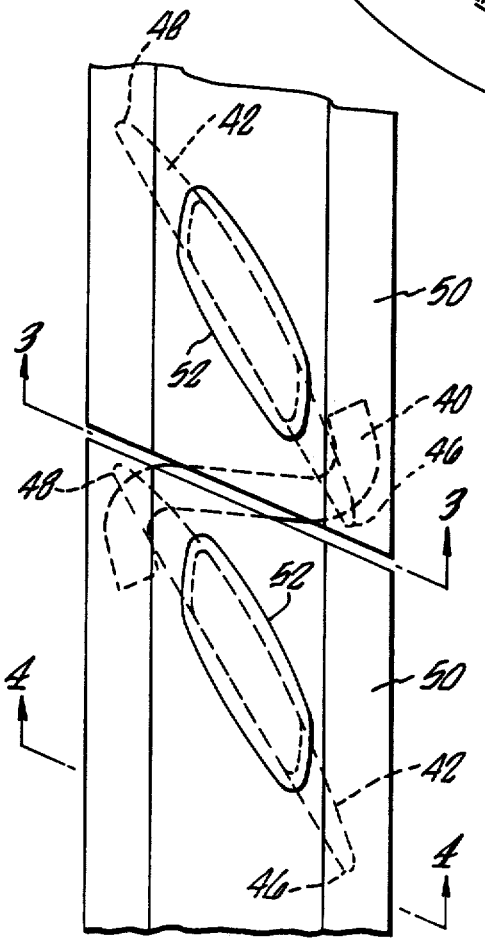
FIG. 2 is a plan view of adjacent end blades of two long arc groups of the rotor structure of FIG. 1, where the end blades are connected by an S-shaped hook.
Figure 3:
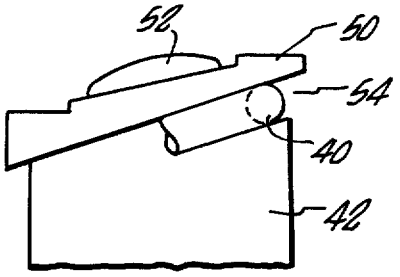
Figure 4:
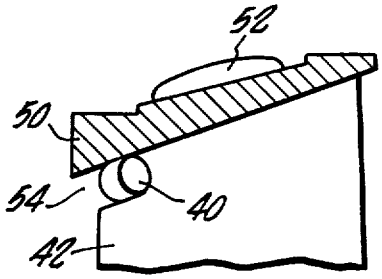
Figure 5:
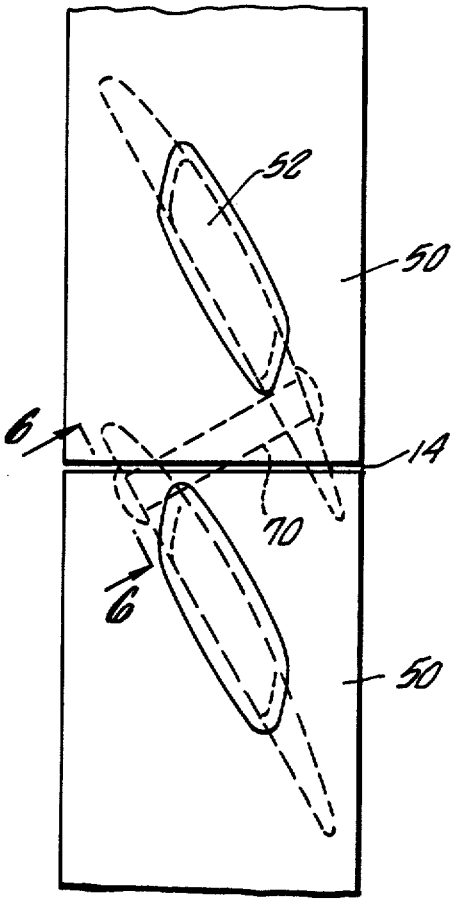
Figure 7:
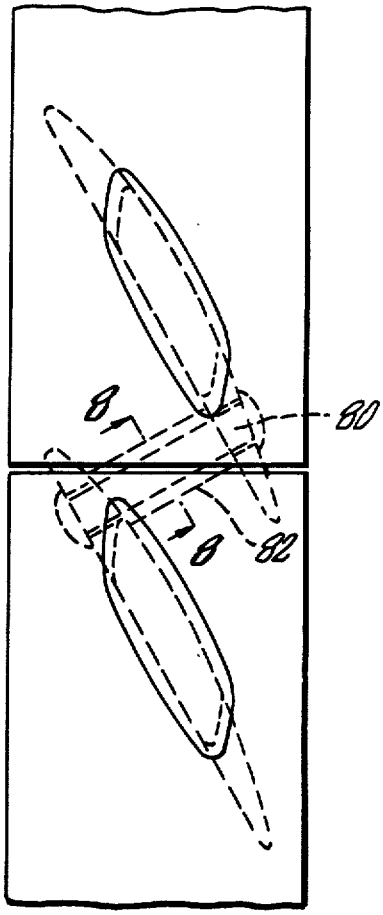
Figure 6:
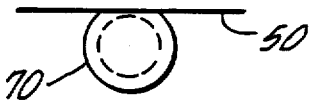
Figure 8:
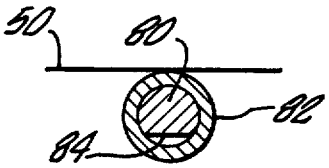

FIGS. 3 and 4 are sectional views of the end blades of FIG. 2 taken on lines 3—3 and 4—4, respectively, of FIG. 2;

FIG. 5 is a view similar to FIG. 2 showing the use of a two-headed pin for connecting end blades together;

FIG. 6 is a sectional view taken along line 6—6 in FIG. 5;

FIG. 7 is a view similar to FIG. 2 showing a solid two-headed pin within a sleeve being used for connecting two end blades together;

FIG. 8 is a sectional view taken along line 8—8 of FIG. 7; and

Figure 1:
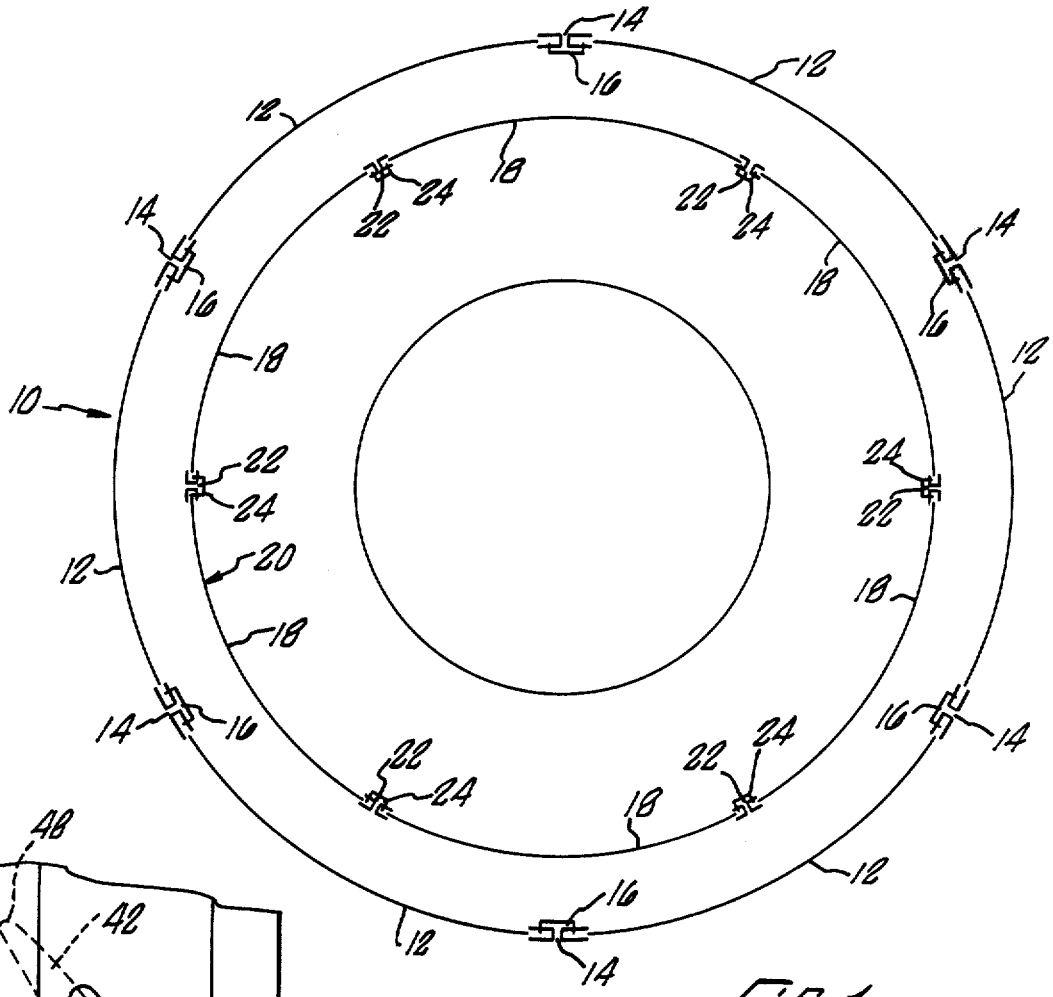
FIG. 1 is a diagrammatic view of a blade structure having a shroud structure and a lashing structure for dividing the blades into long arc groups.
Figure 9:
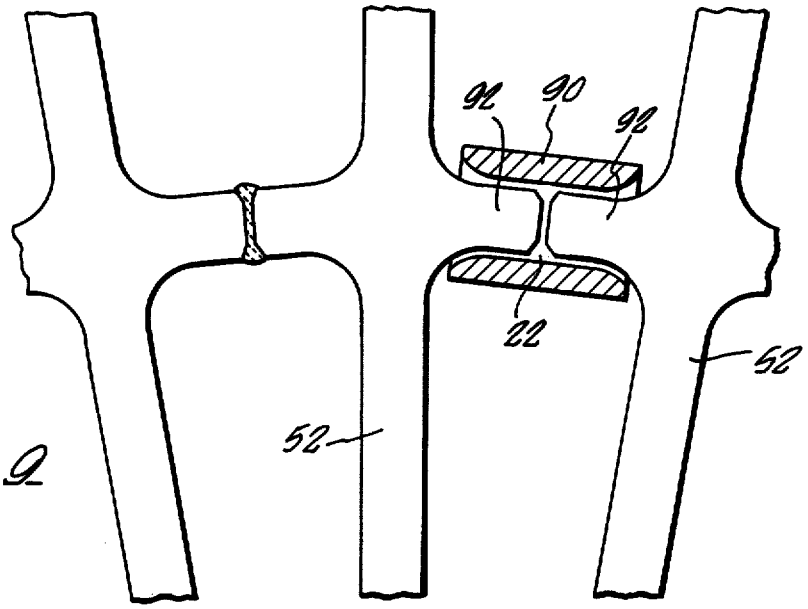
Figure 10:
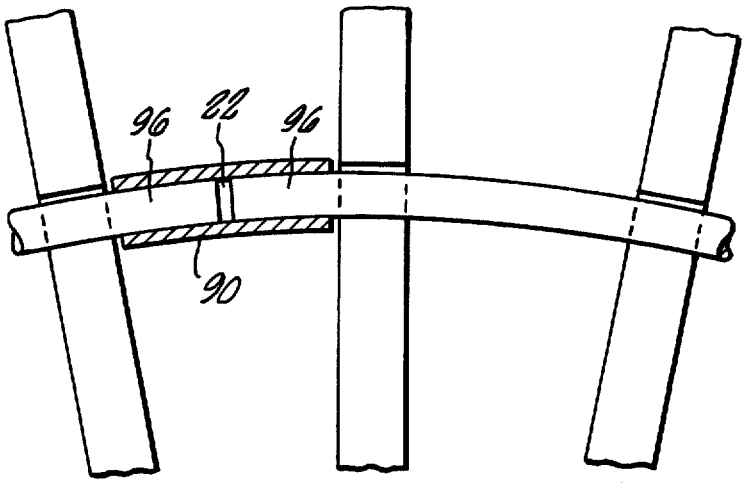

FIGS. 9 and 10 diagrammatically present a front elevation view of sleeves being used for connecting adjacent end blades together at the lashing structure of FIG. 1.

DESCRIPTION

The present invention provides a rotor structure with substantially reduced axial-torsional modes of vibration. The "tangential" mode vibration is the in-phase vibration in the plane of maximum flexibility, perpendicular to the rotational axis of a rotor. The axial mode of vibration is the in-phase vibration in the direction of the axis of the rotor.

With reference to FIG. 1, there is shown diagrammatically a shrouded blade structure. As with a conventional compressor turbine, the blades are carried by a rotor spindle. As described in U.S. Pat. No. 3,588,278, the blades at the tips are rigidly connected by an arcuate shroud ring structure 10 to form arcuate groups 12 of substantially equal central angular extent in degrees. The blades are susceptible to vibrate in a tangential in-phase mode having a resonant frequency at least that of the rated maximum running speed of the rotor. To reduce the tangential mode vibrations, the shroud structure 10 divides the blade groups 12 into a number equal to [an integer (i.e. 1, 2, 3, . . . ) multiple of] the resonant frequency divided by *an integer (i.e. 1, 2, 3, . . . ) multiple of* the rotor running speed. Each blade group 12 contains more than twelve blades and comprises an end blade at each end of a group. As shown in FIG. 1, between the end blades of adjacent groups 12 there is a gap 14.

To reduce axial vibration of the blades, adjacent end blades are flexibly connected across the gap 14 by tie means 16 substantially at the tip of the blades. It is important that the connection be flexible to accommodate thermal and centrifugal stresses that develop during use of the rotor structure. The tie means connect the blades at a location adjacent to the shroud ring structure.

As used herein, the term "flexible" referring to a connection made by a tie means refers to a connection that allows a change in the pitch of the end blades at the gap in the tangential direction. The flexible feature of the connection made by the tie means can be a result of how the tie means is connected to the end blades or the physical configuration and materials used for forming the tie means. A "rigid" connection does not allow any significant change in the pitch of the end blades in the tangential direction.

Instead of using a shroud ring structure 10, as shown in FIG. 1, the blades can be divided into long arc blade groups 18 by a lashing structure 20. The inner long arc groups 18 are of substantially equal center angular extent. As shown in FIG. 1, the end blades of the inner blade groups 18 are secured together by flexible connectors 24.

In a preferred version of the present invention, as shown in FIG. 1, the blades can be divided into the radially outer long arc groups 12 by the shroud ring structure 10 and can be divided into the radially inner long arc blade groups 18 by the lashing structure. Tie means are used between the end blades of the inner and/or outer long arc groups. All of the long arc groups 12 and 18 are of substantially equal central angular extent.

The gaps 22 between the inner blade groups 18 are preferably offset from the gaps 14 of the outer blade groups 12, i.e. the gaps 22 are not directly radially inward from the gaps 14. This construction results in substantial damping of tangential and axial vibrations and axial-torsional amplitudes due to increased stiffness at the gap location. Preferably the gaps 22 are offset from the gaps 14 by a distance substantially equal to one-half the central angular extent of the blade groups 12 for maximum damping of axial-torsional vibrations. As shown in FIG. 1, the end blades of the inner blade groups 18 are secured together by flexile connectors 24

FIGS. 2–4 show an S-shaped hook 40 used for connecting end blades 42 across a gap 14 between adjacent groups of blades 12. The blades 42 are of the usual air foil contour as is well-known in the art with a leading edge 46 and a trailing edge 48. Each blade is provided at its radially outermost tip with an integral blade cover or shroud 50 of arcuate segmental shapes substantially identical to each other. The shroud segments are held in position by tenon buttons 50.

To locate the S-shaped hook or clip 40 in position, the leading and trailing edges of the blades at the shroud gap 14 are provided with a notch 54, which is rounded and polished. The notch is at the tip of the blade just below the shroud, and provides a recess to receive the wire clip 40. The S-shaped clip is preferably a hardened corrosion-resistant steel wire. It is installed at the blades at the notches by forcing the end blades together such as with a "C" clamp. The "C" clamp is removed after the clip 40 is in place, and the clip is retained in position by the blade notches, shroud, and spring tension of the blades in torsion.

The clips 40 can be made of 400 series corrosion-resistant steel using wire with a diameter of from about 3/16 inch to about ½ inch.

A preferred article for connecting end blades together at their tips is shown in FIGS. 5–8. Rather than using the clip 40, it is preferred to use a two-headed solid or hollow pin 70. The pin is installed directly beneath the shroud 50 through holes drilled into the trailing and leading edges of the blades adjacent to the gap 14. The holes and pin geometry are such that the blades can change their pitch in the tangential direction to provide the flexibility required.

As shown in FIGS. 7 and 8, preferably a pin 80 is provided with a sleeve 82. The sleeve 82 can be brazed to the pin 80 to insure against loss of the pin if either of the heads breaks off. As shown in FIG. 8, the underside of the pin 80 can have a flat ground 84 at the central portion only. After the pin has been inserted into the sleeve and peened into position, the sleeve can be staked into the flat 84. Thus, the sleeve mechanically prevents dislodgement of the pin 80 even if either of the pin heads breaks off. Similarly the hollow pin can be flattened at the center to achieve the same result.

Preferably a pin 80 is used rather than a clip 40 because the pin 80 can be contained and is much less likely to fall out of position and damage the rotor structure during use. Further, in some rotor structures, the blades are so short and stiff there is insufficient flexibility to permit assembly of the clip 40 without bending at least one end of the clip to retain it in its groove.

On designs employing two tenons, the clip is preferred to the pins because holes should not be drilled below a tenon.

With reference to FIGS. 9 and 10, the flexible connector 24 used between gaps 22 in the lashing wire structure can be a sleeve 90. As shown in FIG. 9, the sleeve 90 can connect facing lashing lugs 92 of the end blades 52, or as shown in FIG. 10, can connect the ends of the tie wire 96 of the end blades. The sleeves can be made of stainless steel such as types 403, 410, and 422. The sleeves can be held securely in position on one of the wires or lashing lugs by welding, soldering, or swaging. Where loose tie wires are employed, the sleeve is crimped vertically into the gap between the wire segments. The sleeve is mounted on the other lashing wire or lug so that movement along the long axis of the sleeve is possible so that the needed "flexibility" for a change in the pitch at the gap in the tangential direction is possible.

The combined use of rigidly attached harmonic arcuate blade groups with a flexible connection between adjacent groups provides important advantages. In effect, a continuous tie is formed that insures that both tangential and axial modes of vibration are suppressed, and that the axial-torsional modes are limited to continuous tie amplitudes. Further, the design insures that the rotor has the capability to adjust for centrifugal and thermal distortion without excess stress.

Moreover, the design can easily be implemented into existing equipment without replacing blading. Avoidance of blade removal and replacement is particularly attractive because in some instances blading is very difficult to remove, removal is quite expensive, replacement parts may not be available, and substantial outage time is required for removal.

Further, by centering the wire lashing gaps 22 beneath the blade groups 12 formed by the shroud structure, the sine wave of vibration attenuated by the shroud is equally attenuated by the lashing structure. This matching of sine waves results in the suppression of vibrations in the blade groups 18 and greatly offsets the vibration in the blade groups 12. This assists in significantly prolonging the life of a rotor structure.

Although the present invention has been described in considerable detail with reference to certain preferred versions thereof, other versions are possible. For example, the rotor structure of FIG. 1 can be used without the flexible connectors 24 between the end blades of the blade groups formed by the lashing structure. Therefore, the spirit and scope of the appended claims should not necessarily be limited to the description of the preferred versions contained herein.

I claim:

[1. A rotor structure for an axial flow elastic fluid utilizing machine, comprising:

(a) a rotor spindle;

(b) an annular row of radially-extending blades carried by the rotor spindle;

(c) an arcuate shroud ring structure attached to the radially outermost tips of the blades for rigidly connecting the blades to each end other in first long arc groups which comprise more than 12 blades and include an end blade at each end of a group, the first long arc groups being of substantially equal central angular extent, the blades being susceptible to vibrate in a tangential inphase mode having a resonant frequency at least that of the rated maximum running speed of the rotor, the number of first long arc groups being an integer multiple of the blade resonant frequency divided by the rotor running speed; and (d) tie means flexibly connecting the adjacent end blades of a pair of adjacent first long arc groups for reducing axial vibration of the blades, said tie means being connected to the adjacent end blades at a location adjacent to the shroud ring structure.]

[2. The rotor structure of claim 1 wherein each pair of adjacent end blades is flexibly connected by tie means adjacent to the shroud ring structure.]

[3. The structure of claim 1 or 2 in which the tie means comprise an S-shaped wire clip.]

[4. The structure of claim 3 in which the clip is mounted in a notch in each blade of a pair of adjacent end blades.]

[5. The structure of claim 1 in which the tie means comprises a pin mounted in a hole in each of a pair of adjacent end blades.]

[6. The structure of claim 5 in which the pin is solid.]

[7. The structure of claim 6 including a sleeve around and connected to the pin for preventing dislodgement of the pin if the pin breaks.]

[8. The structure of claim 5 in which the pin is hollow.]

[9. The structure of claim 6 or 8 wherein the pin is two headed.]

[10. The structure of claim 1 or 2 including a lashing structure connecting the blades to each other intermediate their radially inner and outer ends for forming second long arc groups of a central angular extent substantially equal to the central angular extent of the first long arc groups, each second long arc group comprising an end blade at each end of the group.]

[11. The structure of claim 10 in which the lashing structure comprises lashing lugs on the blades, and including a sleeve flexibly connecting the lashing lugs of each pair of adjacent end blades.]

[12. The structure of claim 10 including a sleeve flexibly connecting the lashing wires of each pair of adjacent end blades.]

[13. The structure of claim 10 in which the end blades of the second long arc groups are offset from the end blades of the closest first long arc group.]

[14. The structure of claim 13 in which the offset is about one-half of the central angular extent of the first long arc groups.]

[15. A rotor structure for an axial flow elastic fluid utilizing machine, comprising:

(a) a rotor spindle;

(b) an annular row of radially-extending blades carried by the rotor spindle;

(c) a lashing structure for rigidly connecting the blades to each other at a location intermediate their inner and outer ends in long arc groups which comprise more than 12 blades and include an end blade at each end of a group, the long arc groups being of substantially equal central angular extent, the blades being susceptible to vibrate in a tangential inphase mode having a resonant frequency at least that of the rated maximum running speed of the rotor, the number of first long arc groups being an integer multiple of the blade resonant frequency divided by the rotor running speed; and (d) tie means flexibly connecting the adjacent end blades of a pair of adjacent long arc groups for reducing axial vibration of the blades.]

[16. The rotor structure of claim 15 wherein each pair of adjacent end blades is flexibly connected by tie means.]

[17. The structure of claim 15 or 16 in which the lashing structure comprises lashing lugs on the blades, and the tie means comprises a sleeve flexibly connecting the lashing lugs of each pair of adjacent end blades.]

[18. The structure of claim 15 or 16 in which the tie means comprises a sleeve flexibly connecting the lashing wires of each pair of adjacent end blades.]

[19. The structure of claim 15 or 16 in which the tie means comprises a pin mounted in a hole in each of a pair of adjacent end blades.]

[20. The structure of claim 19 in which the pin is solid.]

[21. The structure of claim 20 including a sleeve around and connected to the pin for preventing dislodgement of the pin if the pin breaks.]

[22. The structure of claim 21 wherein the pin is two-headed.]

[23. The structure of claim 5 including a lashing structure connecting the blades to each other intermediate their radially inner and outer ends for forming second long arc groups of a central angular extent substantially equal to the central angular extent of the first long arc groups, each second long arc group consisting of an end blade at each end of the group, and wherein the end blades of the second long arc groups are offset from the end blades of the closest first long arc group.]

*24. In a rotor structure for an axial flow elastic fluid utilizing machine, comprising:*

*(a) a rotor spindle;*

*(b) an annular row of radially-extending blades carried by the rotor spindle;*

*(c) an arcuate shroud ring structure attached to the radially outermost tips of the blades for rigidly connecting the blades to each other in first long arc groups which comprise more than 12 blades and include an end blade at each end of a group, the first long arc groups being of substantially equal central angular extent,*

*the blades being susceptible to vibrate in a tangential inphase mode having a resonant frequency at least that of the rated maximum running speed of the rotor,*

*the number of first long arc groups being equal to the blade resonant frequency divided by an integer multiple of the rotor running speed; and*

*the improvement comprising tie means flexibly connecting the adjacent end blades of a pair of adjacent first long arc groups for reducing axial-torsional vibration of the blades, said tie means being connected to the adjacent end blades at a location adjacent to the shroud ring structure.*

*25. The rotor structure of claim 24 wherein each pair of adjacent end blades is flexibly connected by tie means adjacent to the shroud ring structure.*

*26. The structure of claim 24 in which the tie means comprise an S-shaped wire clip.*

*27. The structure of claim 25 in which the tie means comprise an S-shape wire clip.*

*28. The structure of claim 26 in which the clip is mounted in a notch in each blade of a pair of adjacent end blades.*

*29. The structure of claim 27 in which the clip is mounted in a notch in each blade of a pair of adjacent end blades.*

*30. The structure of claim 24 in which the tie means comprises a pin mounted in a hole in each of a pair of adjacent end blades.*

*31. The structure of claim 30 in which the pin is solid.*

*32. The structure of claim 31 including a sleeve around and connected to the pin for preventing dislodgement of the pin if the pin breaks.*

*33. The structure of claim 30 in which the pin is hollow.*

*34. The structure of claim 31 wherein the pin is two headed.*

*35. The structure of claim 33 wherein the pin is two headed.*

*36. The structure of claim 24 including a lashing structure connecting the blades to each other intermediate their radially inner and outer ends for forming second long arc groups of a central angular extent substantially equal to the central angular extent of the first long arc groups, each second long arc group comprising an end blade at each end of the group.*

*37. The structure of claim 25 including a lashing structure connecting the blades to each other intermediate their radially inner and outer ends for forming second long arc groups of a central angular extent substantially equal to the central angular extent of the first long arc groups, each second long arc group comprising an end blade at each end of the group.*

*38. The structure of claim 36 in which the lashing structure comprises lashing lugs on the blades, and including a sleeve flexibly connecting the lashing lugs of each pair of adjacent end blades.*

*39. The structure of claim 37 in which the lashing structure comprises lashing lugs on the blades, and including a sleeve flexibly connecting the lashing lugs of each pair of adjacent end blades.*

*40. The structure of claim 26 including a sleeve flexibly connecting the lashing wires of each pair of adjacent end blades.*

*41. The structure of claim 37 including a sleeve flexibly connecting the lashing wires of each pair of adjacent end blades.*

*42. The structure of claim 36 in which the end blades of the second long arc groups are offset from the end blades of the closest first long arc group.*

*43. The structure of claim 37 in which the end blades of the second long arc groups are offset from the end blades of the closest first long arc group.*

*44. The structure of claim 42 in which the offset is about one-half of the central angular extent of the first long arc groups.*

*45. The structure of claim 43 in which the offset is about one-half of the central angular extent of the first long arc groups.*

*46. In a rotor structure for an axial flow elastic fluid utilizing machine, comprising:*

*(a) a rotor spindle;*

*(b) an annular row of radially-extending blades carried by the rotor spindle;*

*(c) a lashing structure for rigidly connecting the blades to each other at a location intermediate their inner and outer ends in long arc groups which comprise*

*more than 12 blades and include an end blade at each end of a group, the long arc groups being of substantially equal central angular extent, the blades being susceptible to vibrate in a tangential inphase mode having a resonant frequency at least that of the rated maximum running speed of the rotor;*

*the number of first long arc groups being equal to the blade resonant frequency divided by an integer multiple of the rotor running speed; and*

*the improvement comprising tie means flexibly connecting the adjacent end blades of a pair of adjacent long arc groups for reducing axial-torsional vibration of the blades.*

*47. The rotor structure of claim 46 wherein each pair of adjacent end blades is flexibly connected by tie means.*

*48. The structure of claim 46 in which the lashing structure comprises lashing lugs on the blades, and the tie means comprises a sleeve flexibly connecting the lashing lugs of each pair of adjacent end blades.*

*49. The structure of claim 47 in which the lashing structure comprises lashing lugs on the blades, and the tie means comprises a sleeve flexibly connecting the lashing lugs of each pair of adjacent end blades.*

*50. The structure of claim 46 in which the tie means comprises a sleeve flexibly connecting the lashing wires of each pair of adjacent end blades.*

*51. The structure of claim 47 in which the tie means comprises a sleeve flexibly connecting the lashing wires of each pair of adjacent end blades.*

*52. The structure of claim 46 in which the tie means comprises a pin mounted in a hole in each of a pair of adjacent end blades.*

*53. The structure of claim 47 in which the tie means comprises a pin mounted in a hole in each of a pair of adjacent end blades.*

*54. The structure of claim 52 in which the pin is solid.*

*55. The structure of claim 53 in which the pin is solid.*

*56. The structure of claim 54 including a sleeve around and connected to the pin for preventing dislodgement of the pin if the pin breaks.*

*57. The structure of claim 55 including a sleeve around and connected to the pin for preventing dislodgement of the pin if the pin breaks.*

*58. The structure of claim 56 wherein the pin is two-headed.*

*59. The structure of claim 57 wherein the pin is two-headed.*

*60. The structure of claim 30 including a lashing structure connecting the blades to each other intermediate their radially inner and outer ends for forming second long arc groups of a central angular extent substantially equal to the central angular extent of the first long arc groups, each second long arc group consisting of an end blade at each end of the group, and wherein the end blade at each end of the group, and wherein the end blades of the second long arc groups are offset from the end blades of the closest first long arc group.*

* * * * *

UNITED STATES PATENT AND TRADEMARK OFFICE

CERTIFICATE OF CORRECTION

PATENT NO. : Re. 32,737

DATED : August 23, 1988

INVENTOR(S) : Ralph J. Ortolano

It is certified that error appears in the above-identified patent and that said Letters Patent is hereby corrected as shown below:

On the title page, delete -- [73] Assignee: Southern California Edison, Rosemead, Calif. --.

Signed and Sealed this

Twenty-eighth Day of February, 1989

*Attest:*

DONALD J. QUIGG

*Attesting Officer*

*Commissioner of Patents and Trademarks*